(12) United States Patent
Noguchi et al.

(10) Patent No.: US 6,433,997 B1
(45) Date of Patent: Aug. 13, 2002

(54) TUBULAR ELECTRIC DOUBLE-LAYER CAPACITOR

(75) Inventors: Minoru Noguchi; Shigeki Oyama, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,533

(22) Filed: Oct. 24, 2001

(30) Foreign Application Priority Data

Oct. 25, 2000 (JP) ........................................ 2000-325573

(51) Int. Cl.$^7$ ................................................. H01G 9/02
(52) U.S. Cl. ........................................ 361/511; 361/512
(58) Field of Search .............................. 361/301.5, 511, 361/512, 517, 518, 530, 535, 536; 29/25.03, 25.42

(56) References Cited

U.S. PATENT DOCUMENTS 5,150,283 A * 9/1992 Yoshida et al. ............ 29/25.03
5,914,852 A * 6/1999 Hatanaka et al. ........... 361/523
6,307,735 B1 * 10/2001 Saito et al. .................. 361/512

* cited by examiner

Primary Examiner—Anthony Dinkins
(74) Attorney, Agent, or Firm—Arent Fox Kintner Plotkin & Kahn, PLLC

(57) ABSTRACT

A cylindrical electric double-layer capacitor 1 includes an electrode roll made by spirally rolling a superposed assembly formed of a band-shaped positive pole and a band-shaped negative pole superposed on each other with a first separator interposed therebetween and a second separator superposed on one of the band-shaped positive and negative poles so that the second separator is located on an outermost side, and a vessel in which the electrode roll is accommodated. A cylindrical electrode is mounted on the electrode roll to come into contact with an outer peripheral surface of the electrode roll. The polarity of the cylindrical electrode is set to be opposite from that of a portion of one of the band-shaped positive and negative poles which is located on an outermost periphery of the electrode roll.

3 Claims, 7 Drawing Sheets

TUBULAR ELECTRIC DOUBLE-LAYER CAPACITOR

BACKGROUND OF THE INVENTION

1. Field of the Invention

The present invention relates to a tubular electric double-layer capacitor, and particularly, to a tubular electric double-layer capacitor, comprising an electrode roll made by rolling a superposed assembly including a band-shaped positive pole and a band-shaped negative pole superposed on each other with a first separator interposed therebetween and a second separator superposed on one of the band-shaped positive and negative poles, so that the second separator is located on an outermost side, and a vessel in which the electrode roll is accommodated.

2. Description of the Related Art

In a conventional electrode roll, a portion of one of the band-shaped positive and negative poles located on an outermost periphery, namely an annular outer peripheral surface of a last turn, has no mating electrode opposed thereto.

In the prior art, there is a disadvantage that the annular outer peripheral surface of the last turn does not participate in ensuring an electrostatic capacity and hence, is useless. The amounts of band-shaped positive and negative poles utilized are different from each other, thereby bringing about an unbalance between potentials, and causing deterioration of the performance.

OBJECT AND SUMMARY OF THE INVENTION

It is an object of the present invention to provide a tubular electric double-layer capacitor of the above-described type, wherein the entire opposite sides of the band-shaped positive and negative poles of the electrode roll can be utilized effectively for ensuring an electrostatic capacity, and deterioration of the performance can be inhibited to the utmost by equalizing the amounts of band-shaped positive and negative poles utilized.

To achieve the above object, according to the present invention, there is provided a tubular electric double-layer capacitor comprising an electrode roll made by spirally rolling a superposed assembly including a band-shaped positive pole and a band-shaped negative pole superposed on each other with a first separator interposed therebetween and a second separator superposed on one of the band-shaped positive and negative poles so that the second separator is located on an outermost side, and a vessel in which the electrode roll is accommodated. A tubular electrode is mounted on the electrode roll to come into contact with an outer peripheral surface of the electrode roll, and the polarity of the tubular electrode is set to be opposite from that of a portion of the one of the band-shaped positive and negative poles which is located on an outermost periphery of the electrode roll.

With the above arrangement, the annular outer peripheral surface of the last turn, which is a portion of one of the band-shaped positive and negative poles of the electrode roll, is opposed to the tubular electrode having a polarity different from the polarity thereof with the second separator interposed therebetween to the mating electrode. Thus, it is possible to effectively utilize the entire opposite sides of the band-shaped positive and negative poles of the electrode roll for ensuring an electrostatic capacity, thereby increasing the electrostatic capacity more than that in the prior art. In addition, the potentials of both the poles can be balanced with each other by equalizing the amounts of band-shaped positive and negative poles utilized, thereby inhibiting the deterioration of the electric double-layer capacitor to the utmost.

DETAILED DESCRIPTION OF THE EXEMPLARY EMBODIMENTS OF THE INVENTION

Figure 1:
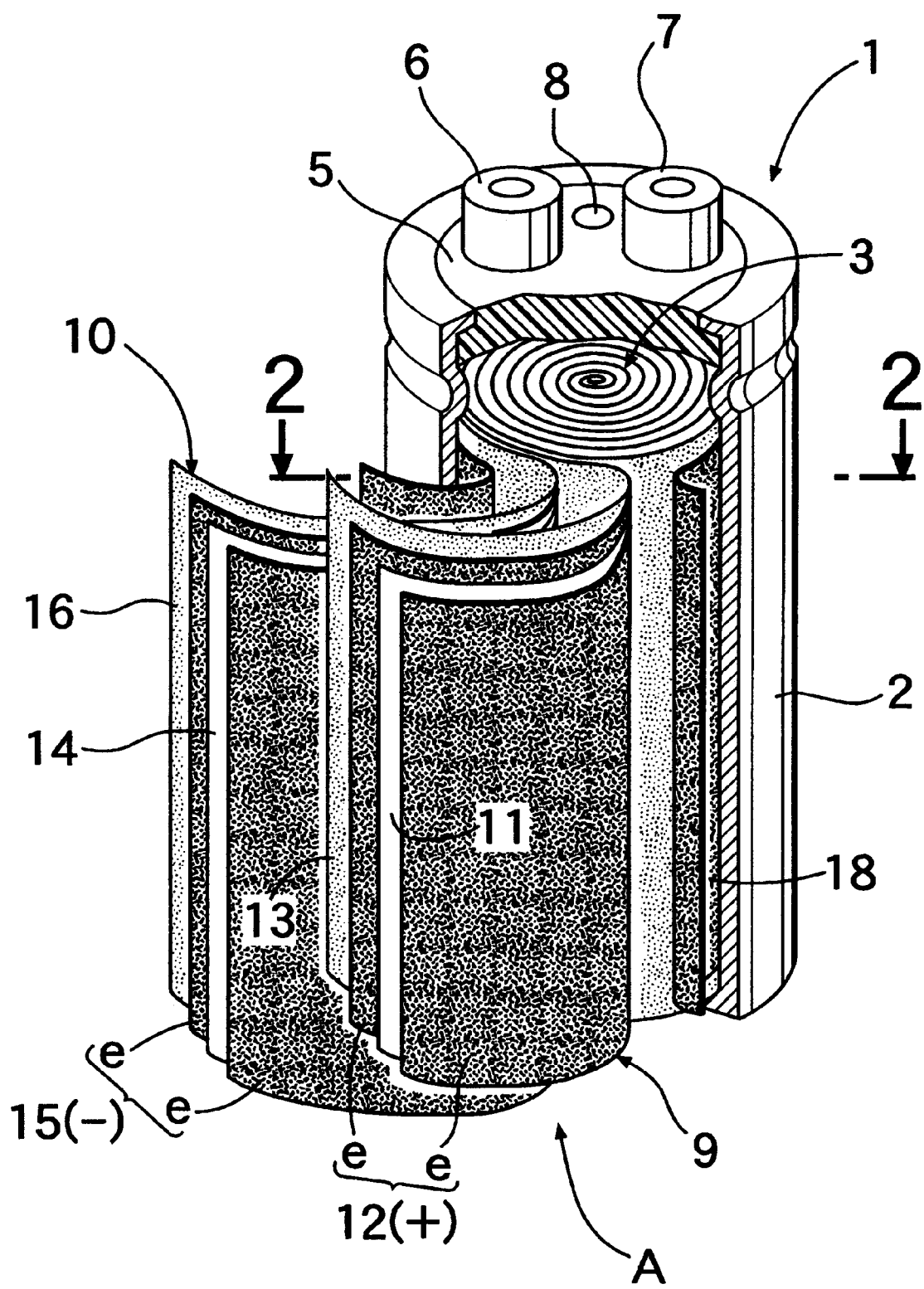
FIG. 1 is a broken perspective view of an essential portion of a cylindrical electric double-layer capacitor.
Figure 2:
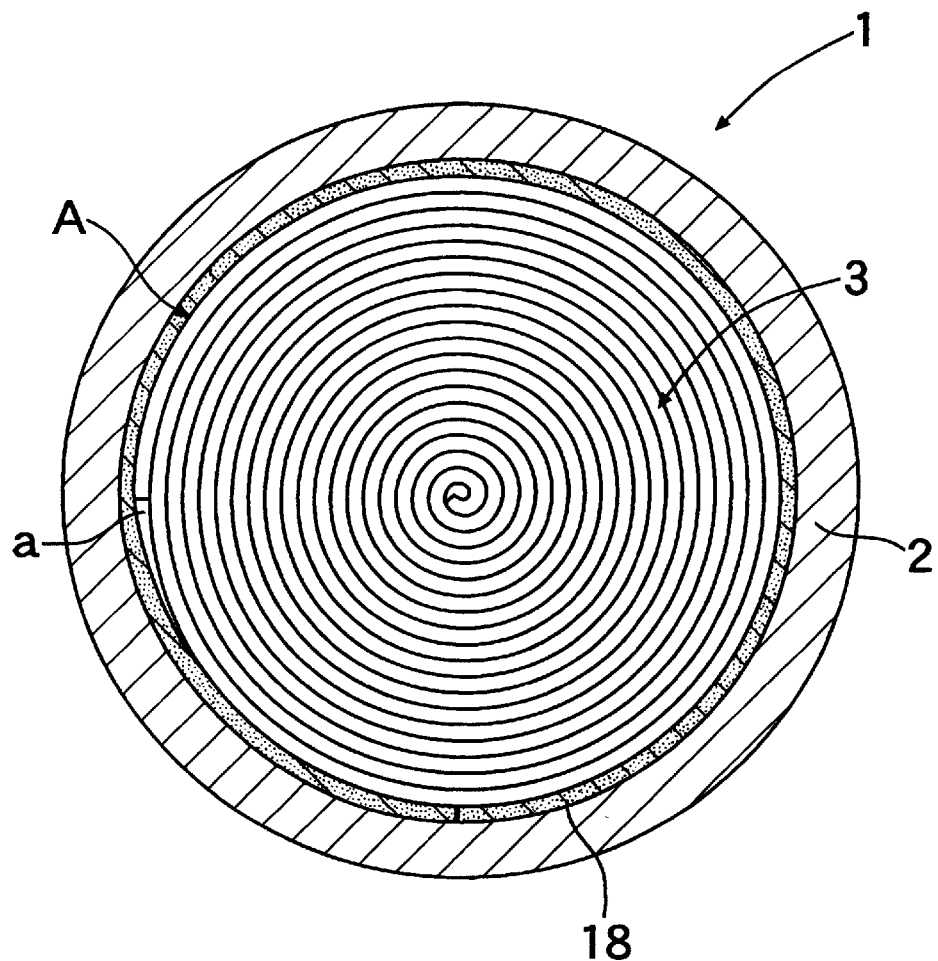
FIG. 2 is a cross-sectional view taken along a line 2–2 in FIG. 1.

Referring to FIGS. 1 and 2, a cylindrical electric double-layer capacitor 1 includes a conductive bottomed cylindrical vessel 2, an electrode roll 3 accommodated in the vessel 2, a liquid electrolyte poured into the vessel 2, and electrically insulating terminal plate 5 which closes an opening in one end of the vessel 2. The terminal plate 5 is provided with positive and negative terminals 6 and 7, respectively, and a safety valve 8. The vessel 2 is formed of, for example, an aluminum alloy, and the terminal plate 5 is formed of, for example, a synthetic resin.

The electrode roll 3 includes a positive-polar laminated band 9 and a negative-polar laminated band 10. The positive-polar laminated band 9 includes a band-shaped collector 11 formed of an aluminum foil, band-shaped polarizable electrodes e adhered to opposite sides of the band-shaped collector 11 with a conductive adhesive, respectively, and a first separator 13 made of polytetrafluoroethylene (PTFE) and superposed on one of the band-shaped polarizable electrodes e. A band-shaped positive pole 12 is constituted by the pair of the polarizable electrodes e. The liquid electrolyte is retained in an impregnated manner in the first separator 13. The negative-polar laminated band 10 includes a band-shaped collector 14 formed of an aluminum foil, band-shaped polarizable electrodes e adhered to opposite sides of the band-shaped collector 14 with a conductive adhesive, respectively, and a second separator 16 made of polytetrafluoroethylene (PTFE) and superposed on one of the band-shaped polarizable electrodes e. A band-shaped negative pole 15 is constituted by the pair of the polarizable electrodes e. The liquid electrolyte is retained in an impregnated manner in the second separator 16.

Figure 3:
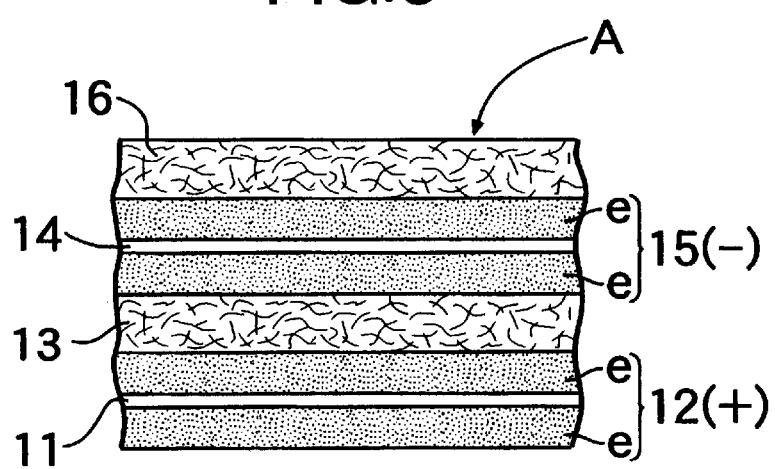
FIG. 3 is a side view of a portion of a superposed assembly comprising a positive-polar laminated band and a negative-polar laminated band.
Figure 4:
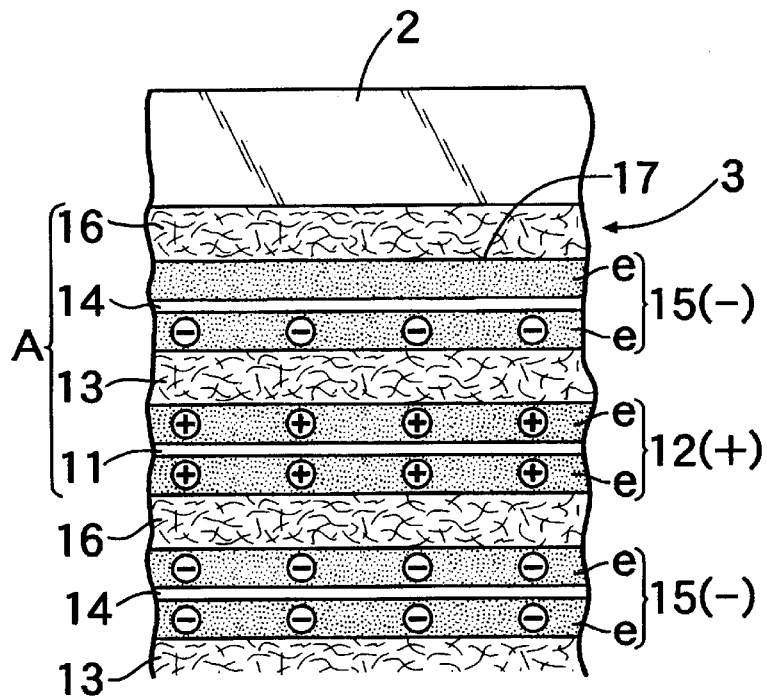
FIG. 4 is a view showing a charged state when no cylindrical electrode exists on an outer peripheral surface of an electrode roll.

To produce the electrode roll 3, the first separator 13 of the positive-polar laminated band 9 is superposed onto the exposed polarizable electrode e of the negative-polar laminated band 10. As a result, a superposed assembly A is formed, which comprises the band-shaped positive pole 12 and the band-shaped negative pole 15 superposed on each other with the first separator 13 interposed therebetween, and the second separator 16 superposed on one of the band-shaped positive and negative poles 12 and 15, e.g., on the band-shaped negative pole 15 in the illustrated embodiment, as shown in FIG. 3. This superposed assembly A is wound spirally, so that the second separator 16 of the negative-polar laminated band 10 is located on an outermost side.

Each of the band-shaped positive pole 12 and the band-shaped negative pole 15 is formed using alkali-activated carbon made from meso-fused pitch as a main component. One example of the liquid electrolyte, which may be used, is a solution of a quaternary ammonium borofluoride compound (a solute), e.g., triethylmethyl ammonium borofluoride, (TEMA.BF$_4$[(C$_2$H$_5$ )$_3$CH$_3$N.BF$_4$]) in propylene carbonate (PC) as a solvent.

If charging is conducted in an electric double-layer capacitor 1 including the vessel 2 whose inner peripheral surface is formed of an aluminum alloy, an annular outer peripheral surface 17 on the last turn of the band-shaped negative pole 15 in the electrode roll 3 does not participate in ensuring an electrostatic capacity and hence, is useless.

Figure 5:
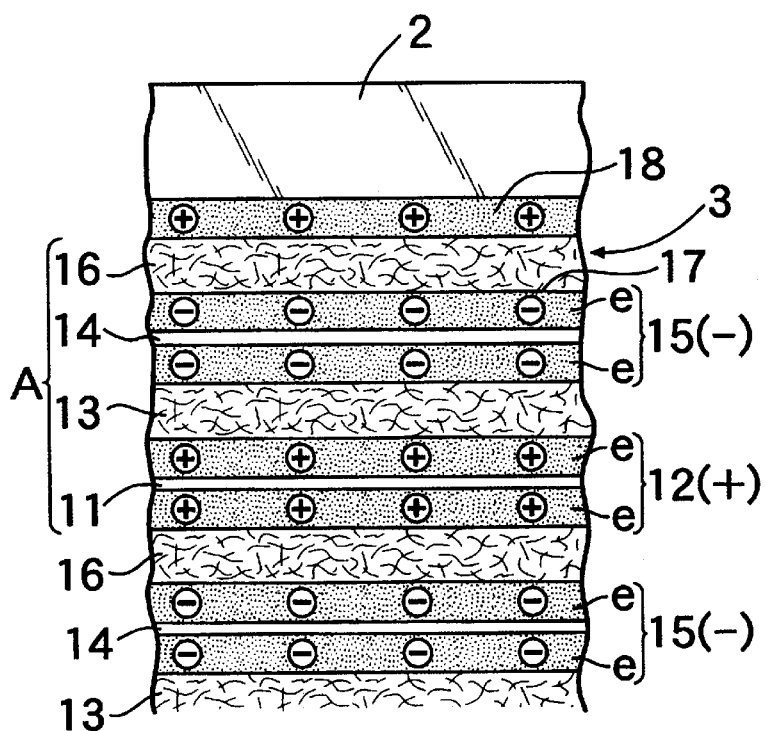
FIG. 5 is a view showing a charged state when a cylindrical electrode exists on the outer peripheral surface of the electrode roll.

Therefore, as shown in FIGS. 1, 2 and 5, a tubular, e.g., cylindrical shown in the illustrated embodiment, electrode 18 is mounted on the electrode roll 3 to come into contact, preferably, close contact with an outer peripheral surface of the electrode roll 3, and the polarity of the cylindrical electrode 18 is set to be opposite from the polarity of one of the band-shaped positive and negative poles 12 and 15, e.g., a portion of the band-shaped negative pole 15 located on the outermost periphery of the electrode roll 3 in the illustrated embodiment, namely, positive. In this case, in order to use the vessel 2 as a collector of the cylindrical electrode 18, an outer peripheral surface of the electrode 18 is brought into contact, preferably, close contact with an inner peripheral surface of the vessel 2.

With the above arrangement, the annular outer peripheral surface 17 on the last turn of the band-shaped negative pole 15 in the electrode roll 3 is opposed to the cylindrical electrode 18 having the polarity different from that of the surface 17 with the second separator 16 interposed therebetween, thereby carrying the mating electrode thereon. Thus, the entire opposite sides of the band-shaped positive and negative poles 12 and 15 of the electrode roll 3 can be utilized for ensuring an electrostatic capacity, whereby the electrostatic capacity can be increased more than that in the prior art. In addition, the potentials of the band-shaped positive and negative poles 12 and 15 can be balanced with each other by equalizing the amounts of band-shaped positive and negative poles 12 and 15 utilized, thereby inhibiting the deterioration of the performance of the electric double-layer capacitor to the utmost.

When the cylindrical electrode 18 is formed using the alkali-activated carbon made of the meso-fused pitch, the polarity of the cylindrical electrode 18 is set to be positive, as described above. Thus, the cylindrical electrode 18 can be wetted and brought into close contact with the second separator 16 and the vessel 2.

Figure 6:
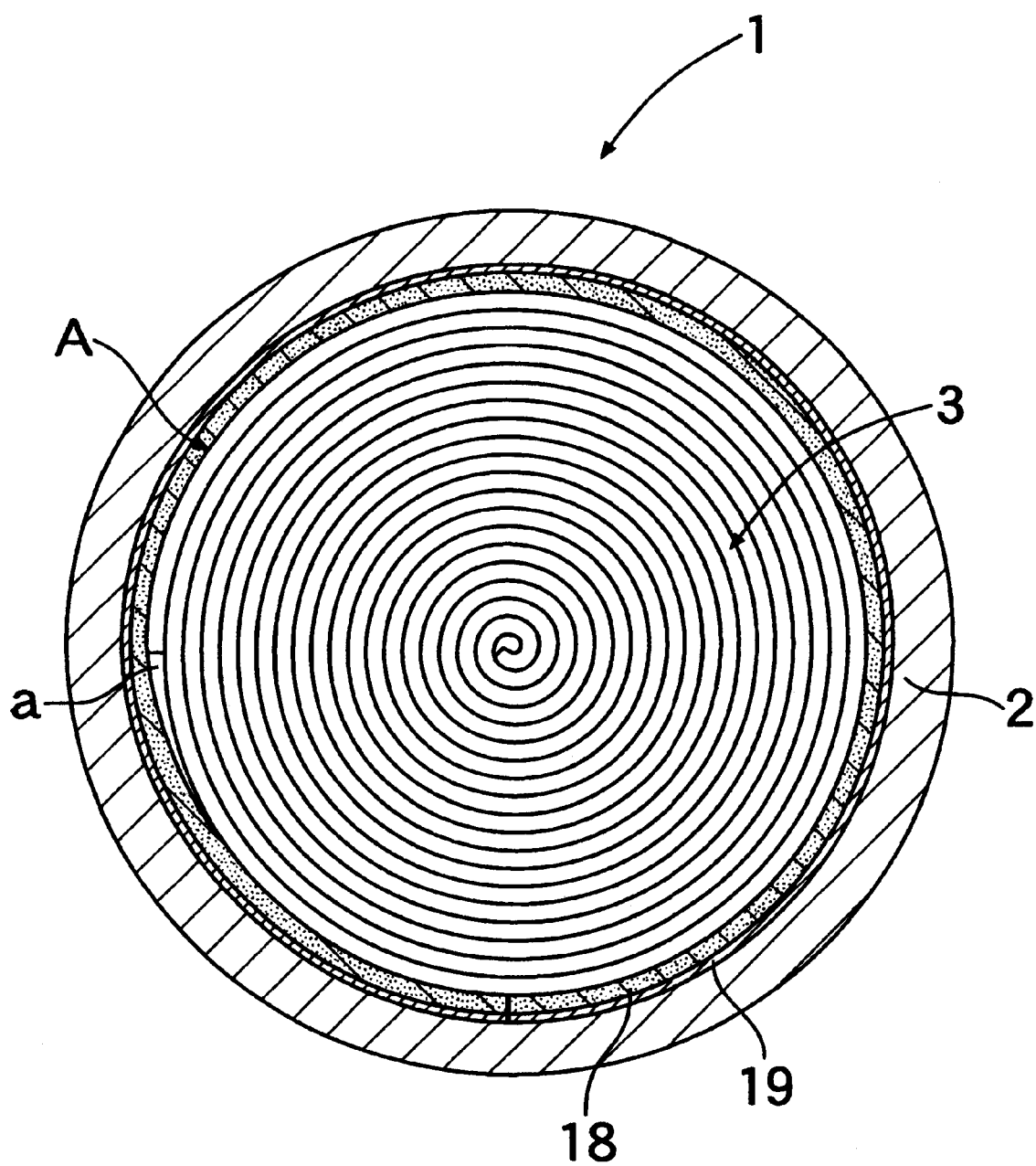
FIG. 6 is a sectional view similar to FIG. 2, but showing a cylindrical electric double-layer capacitor with a cylindrical electrode and a cylindrical collector existing on the outer peripheral surface of the electrode roll.
Figure 7:
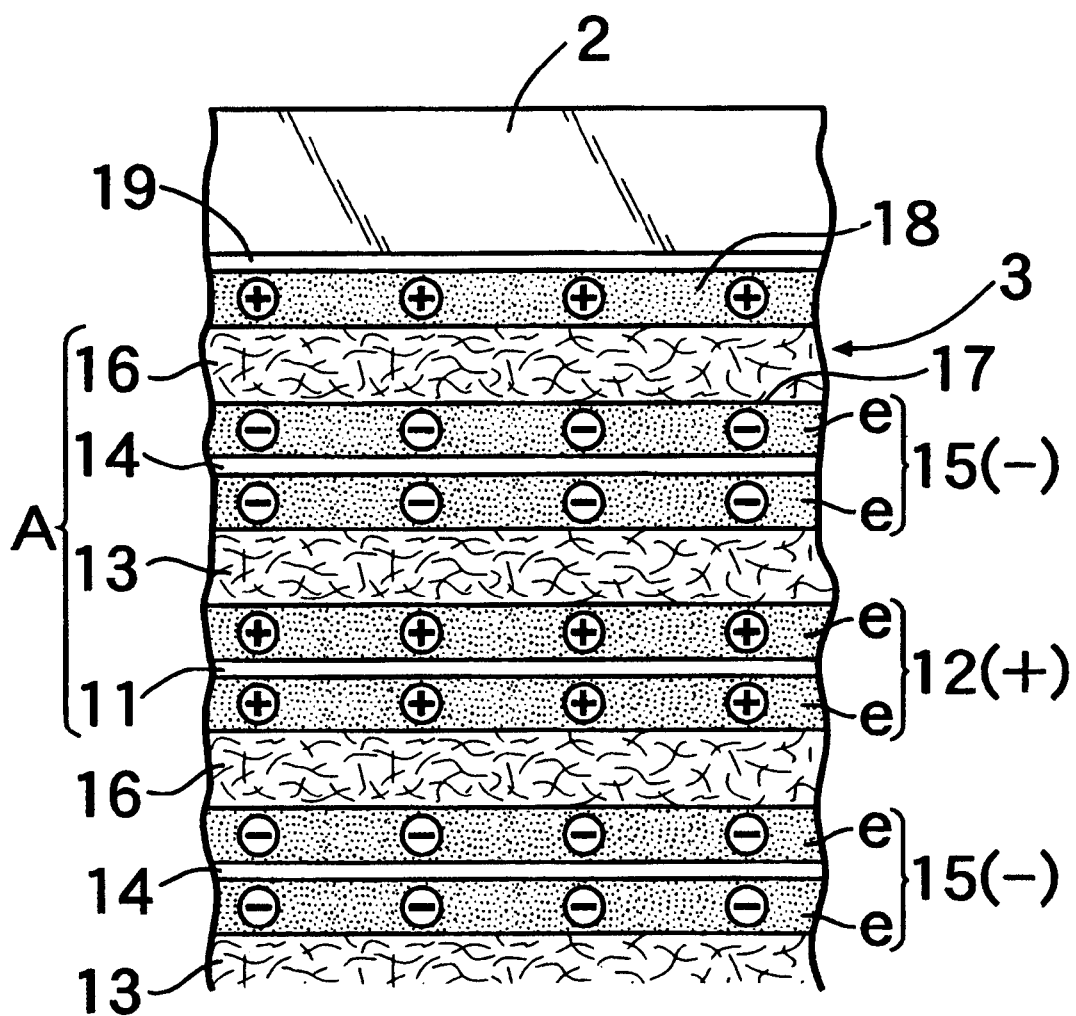
FIG. 7 is a view showing a charged state when the cylindrical electrode and the cylindrical collector exist on the outer peripheral surface of the electrode roll.

FIGS. 6 and 7 show another embodiment, in which a tubular, e.g., cylindrical shown in the illustrated embodiment, collector 19 is mounted on the cylindrical electrode 18 to come into contact with the outer peripheral surface of the cylindrical electrode 18.

With the above arrangement, it is not required that the outer peripheral surface of the collector 19 is brought into close contact with the inner peripheral surface of the vessel 2. Therefore, the dimensional accuracy regarding the diameter of the electrode roll 3 can be moderated, leading to an improvement in productivity of the electrode roll 3.

Particular examples will be described below.

First, alkali-activated carbon, e.g., KOH-activated carbon in the illustrated embodiment, was produced in the following manner using a starting material of meso-fused pitch:

(a) Massive meso-fused pitch was subjected to a pulverizing treatment at room temperature to produce a powder having an average particle size of 300 μm. Then, the powder was subjected to an infusibilizing treatment at 350° C. for 2 hours in the atmospheric current and then to a carbonizing treatment at 700° C. for 1 hour in the current of nitrogen gas to provide a carbonized powder. (b) The carbonized powder and an amount of KOH two times the weight of carbon were mixed together, and the resulting mixture was subjected to a potassium activating treatment as an alkali activating treatment at 800° C. for 5 hours in the current of nitrogen gas, followed by the post treatments such as neutralizing by hydrochloric acid, washing and drying, thereby producing KOH-activated carbon. (c) The KOH-activated carbon was subjected to a pulverizing treatment using a jet mill to produce a fine powder of KOH-activated carbon having an average particle size of 30 μm. This fine KOH-activated carbon powder is called simply a KOH-activated carbon powder.

Example (1)

The KOH-activated carbon powder, a graphite powder as a conductive filler and PTFE as a binder were weighted, so that a weight ratio of 85:12.5:2.5 was obtained. Then, the weighted materials were kneaded together and then subjected to rolling to fabricate an electrode sheet having a thickness of 175 μm.

Two band-shaped polarizable electrodes e each having a width of 95 mm and a length of 1,500mm were cut from the electrode sheet and then bonded to opposite sides of a band-shaped collector 11 having a width of 105 mm, a length of 1,500 mm and a thickness of 40 μm using a conductive adhesive, respectively, thereby forming a band-shaped positive pole 12. Thereafter, a first separator 13 made of PTFE and having a thickness of 75 μm was superposed on one of the band-shaped polarizable electrodes e to form a positive-polar laminated band 9.

Then, two band-shaped polarizable electrodes e each having a width of 95 mm and a length of 1,500 mm were cut from the electrode sheet and then bonded to opposite sides of a band-shaped collector 14 having a width of 105 mm, a length of 1,500 mm and a thickness of 40 μm using a conductive adhesive, respectively, thereby forming a band-shaped negative pole 15. Thereafter, a second separator 16 made of PTFE and having a thickness of 75 μm was superposed on one of the band-shaped polarizable electrodes e to form a negative-polar laminated band 10.

The first separator 13 of the positive-polar laminated band 9 was superposed on the exposed band-shaped polarizable electrode e of the negative-polar laminated band 10, and the resulting superposed assembly A was rolled spirally, so that the second separator 2 of the negative-polar laminated band 10 was located on an outermost side, thereby producing an electrode roll 3 having a diameter of about 49 mm.

Further, a band-shaped electrode cut from the electrode sheet and having a width of 95 mm and a length of 157 mm was wound around the outer peripheral surface of the electrode roll 3. Opposite ends of the wound band-shaped electrode were abutted against each other and fixed by a conductive adhesive tape, thereby forming a cylindrical electrode 18 having a length of 95 mm and a thickness of 175 μm.

The electrode roll 3 having the cylindrical electrode 18 and the liquid electrolyte comprising 1.5 moles of TEMA.BF$_4$ dissolved in a PC solution were placed into a vessel 2 having an inside diameter of 50 mm and length of 130 mm. An outer peripheral surface of the cylindrical electrode 18 was brought into close contact with an inner peripheral surface of the vessel 2 and then, an opening in the vessel 2 was closed by a terminal plate 5. Upon closing, the collectors 11 and 14 of the positive-polar laminated band 9 and the negative-polar laminated band 10 were connected to a positive terminal 6 and a negative terminal 7 of the terminal plate 5, and the cylindrical electrode 18 was connected to the positive terminal 6 through the vessel 2. A cylindrical electric double-layer capacitor 1 made in the above manner is called example (1). A relatively large gap a is shown in FIG. 2 as being created between a terminal end of the superposed assembly A and the cylindrical electrode 18, but this gap a was formed for drawing the figure. In practice, the superposed assembly A is extremely thin and hence, such a gap a is not created.

Example (2)

An electrode roll 3 having a diameter of about 49 mm was produced in the same manner as in Example (1). A band-shaped electrode having a width of 95 mm and a length of 157 mm was cut from the electrode sheet described in Example (1) and then bonded to one surface of a band-shaped collector having a width of 105 mm, a length of 157 mm and a thickness of 40 μm using a conductive adhesive, thereby forming a band-shaped element. Thereafter, the band-shaped element was superposed on a second separator 16, and the resulting superposed assembly was wound around the outer peripheral surface of the electrode roll 3, and opposite ends thereof were abutted against each other and fixed by an adhesive tape, thereby forming a cylindrical electrode 18 having a length of 95 mm and a thickness of 175 μm, and a cylindrical collector 19 in close contact with an outer peripheral surface of the cylindrical electrode 18 and having a length of 105 mm and a width of 40 μm.

The electrode roll 3 having the cylindrical electrode 18 and the cylindrical collector 19 and a liquid electrolyte comprising 1.5 moles of TEMA.BF$_4$ dissolved in a PC solution were placed into a vessel 2 having an inside diameter of 50 mm and a length of 130 mm, and an opening in the vessel was closed by a terminal plate 5. In such closing, the collectors 11 and 14 of the positive-polar laminated band 9 and the negative-polar laminated band 10 were connected to a positive terminal 6 and a negative terminal 7 of the terminal plate 5, and the cylindrical electrode 18 was connected to the positive terminal 6 through the cylindrical collector 19. A cylindrical electric double-layer capacitor 1 made in the above manner is called example (2).

Comparative Example

As a comparative example, a cylindrical electric double-layer capacitor 1 was produced, which had a structure similar to that in example (1), except that an electrode roll 3 having no cylindrical electrode 18 on its outer peripheral surface was used.

Performance of Electric Double-layer Capacitor

Table 1 shows initial performances of the examples (1) and (2) and the comparative example.

TABLE 1

| | Initial performance | |
|---|---|---|
| | Internal resistance (mΩ) | Electrostatic capacity (F) |
| Example (1) | 2.9 | 3180 |
| Example (2) | 2.8 | 3193 |
| Comparative Example | 3.1 | 3020 |

It can be seen from Table 1 that the internal resistances in examples (1) and (2) are substantially equal to that in the comparative example, but the internal resistances in example (1) is about 5.3% higher than that in the comparative example, and the internal resistances in example (2) is about 5.7% higher than that in the comparative example. This is attributable to that the entire opposite surfaces of the band-shaped positive and negative poles 12 and 15 of the electrode roll 3 were utilized effectively to ensure the electrostatic capacity by the presence of the cylindrical electrode 18.

Figure 8:
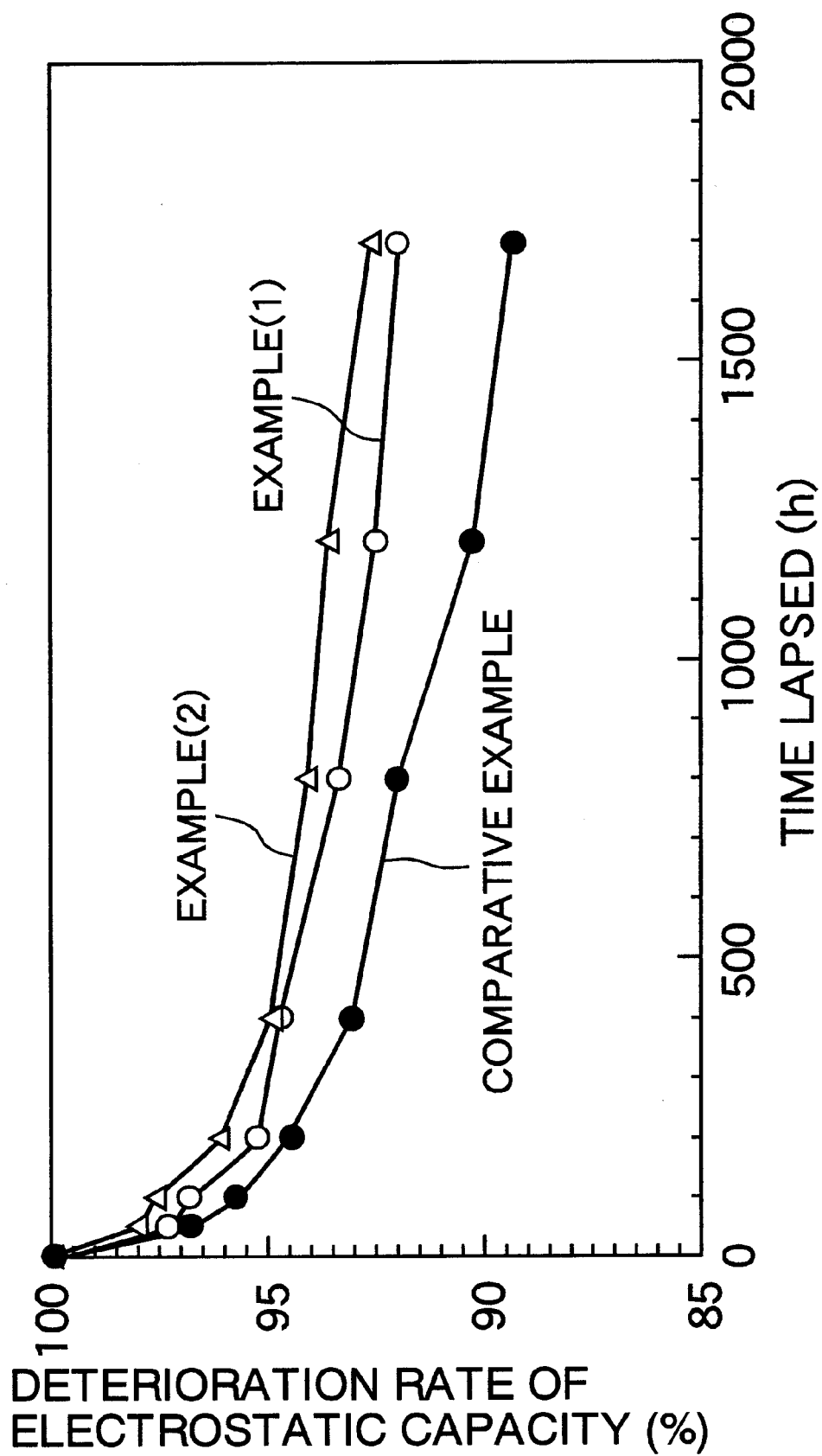
FIG. 8 is a graph showing the relationship between the time lapsed and the deterioration rate of the electrostatic capacity.
Figure 9:
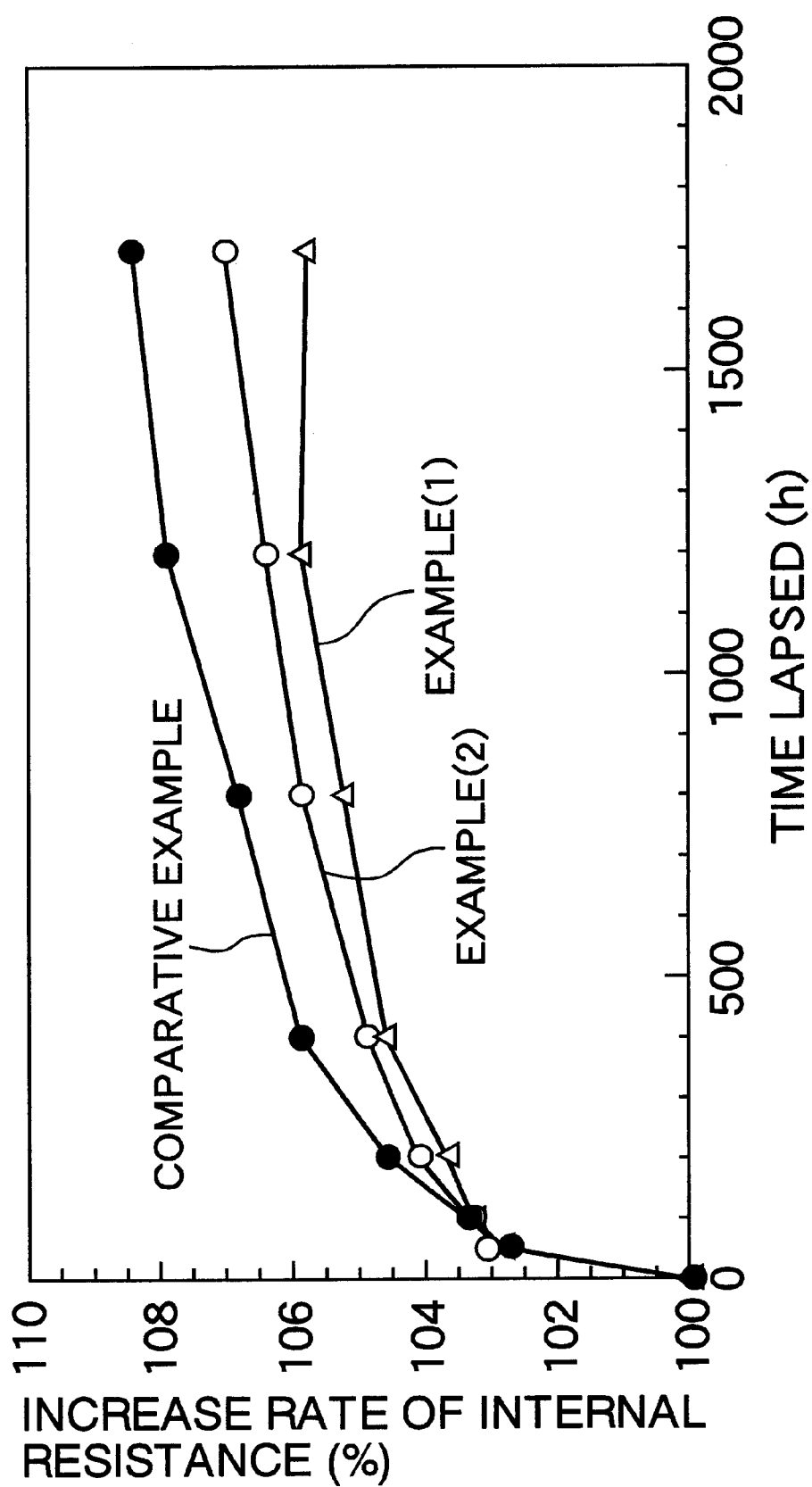
FIG. 9 is a graph showing the relationship between the time lapsed and the increase rate of the internal resistance.

In consideration of the service lives of examples (1) and (2) and the comparative example, the continuous application of a voltage of 2.5 V for 1,700 hours was carried out in an atmosphere of 45° C., and deterioration rates of the electrostatic capacity and increase rates of the internal resistance in examples (1) and (2) and the comparative example were measured, thereby providing results shown in FIGS. 8 and 9. It can be seen from FIGS. 8 and 9 that both of the deterioration rates of the electrostatic capacity and the increase rates of the internal resistance in examples (1) and (2) are lower than those in the comparative example and hence, each of the examples (1) and (2) has a service life higher than that of the comparative example. This is attributable to that the amounts of negative and positive electrodes 12 and 15 utilized were equalized by the presence of the cylindrical electrode 18.

Variations in deterioration rate of the electrostatic capacity and in increase rate of the internal resistance are due to the generation of a gas and the like.

According to one embodiment of the present invention, it is possible to provide the tubular electric double-layer capacitor having an increased electrostatic capacity and an excellent durability by constructing it as described above.

According to another embodiment of the present invention, it is possible to provide the tubular electric double-layer capacitor which has the above-described effect, and whose structure is simplified by utilizing a vessel also serving as a collector of the tubular electrode.

According to another embodiment of the present invention, it is possible to provide the tubular electric double-layer capacitor which has the effect provided by claim 1 of the present invention and which is good in productivity.

What is claimed is:

1. A tubular electric double-layer capacitor, comprising:
   an electrode roll made by spirally rolling a superposed assembly including a band-shaped positive pole and a band-shaped negative pole superposed on each other with a first separator interposed therebetween and a second separator superposed on one of the band-shaped positive and negative poles so that the second separator is located on an outermost side; and a vessel in which said electrode roll is accommodated, wherein a tubular electrode is mounted on said electrode roll to come into contact with an outer peripheral surface of said electrode roll, and a polarity of the tubular electrode is set to be opposite from that of a portion of one of the band-shaped positive and negative poles which is located on an outermost periphery of said electrode roll.

2. A tubular electric double-layer capacitor according to claim 1, wherein said vessel has an electric conductivity, and an outer peripheral surface of said tubular electrode is in contact with an inner peripheral surface of said vessel.

3. A tubular electric double-layer capacitor according to claim 1, wherein a tubular collector is mounted on said tubular electrode to come into contact with an outer peripheral surface of said tubular electrode.

* * * * *